March 19, 1946. T. H. KRUEGER Re. 22,733

STRIP SERVING MACHINE

Original Filed Aug. 19, 1942 2 Sheets-Sheet 1

INVENTOR
THEODORE H. KRUEGER
BY
Morsell & Nolte
ATTORNEYS

March 19, 1946. T. H. KRUEGER Re. 22,733

STRIP SERVING MACHINE

Original Filed Aug. 19, 1942 2 Sheets-Sheet 2

INVENTOR
THEODORE H. KRUEGER
BY
Moses & Nolte
ATTORNEYS

Reissued Mar. 19, 1946

Re. 22,733

UNITED STATES PATENT OFFICE 22,733

STRIP SERVING MACHINE

Theodore H. Krueger, Stratford, Conn., assignor to Better Packages Incorporated, a corporation of New York Original No. 2,362,641, dated November 14, 1944, Serial No. 455,311, August 19, 1942. Application for reissue November 13, 1945, Serial No. 628,346

15 Claims. (Cl. 164—84.5)

This invention relates to an improved apparatus for serving measured strips of tape which are covered or impregnated on one side thereof with a pressure sensitive adhesive usually tacky or non-drying either permanently or during the period of use. The invention has particular utility in the various fields of use to which pressure sensitive adhesive tape is applied and especially is useful where the tape is required in short lengths such as fractional parts of a foot. It eliminates the tedious nuisance and waste involved in cutting inaccurate lengths with ordinary scissors and provides a simple and easy operating mechanism for speedily stripping from the roll, measuring, cutting and delivering at a point ready for use, the desired length of tape.

The improved apparatus contemplates mechanical means for stripping the material or tape from the roll in predetermined lengths and comprises generally a slidable measuring element adapted to be grasped with the tape adhering thereto at or near the leading end of the tape. The slidable element with the tape adhered thereto may then be drawn in its slide to draw tape from the roll and a suitable stop for the element is provided which stop may be adjustably mounted so that it may move a variety of different distances from the starting point and thus a variety of lengths of strip may be dispensed. Severing of the tape is accomplished by tear-off means as will be described.

It is a particular object of the invention to provide a dispenser for strips of normally tacky tape in which the operator grasps the tape and a measuring element together and moves them through a distance equal to the length of tape desired, with a stop which prevents further movement of the measuring element and thus limits the length of tape dispensed.

It is a further object of the invention to provide a tape dispenser having severing means mounted so that after a delivered strip has been severed a portion of the tape is left in extended position from the machine ready to be grasped for the next delivery.

Further objects and advantages will appear from the following detailed description taken in connection with the drawings in which.

Figure 1:
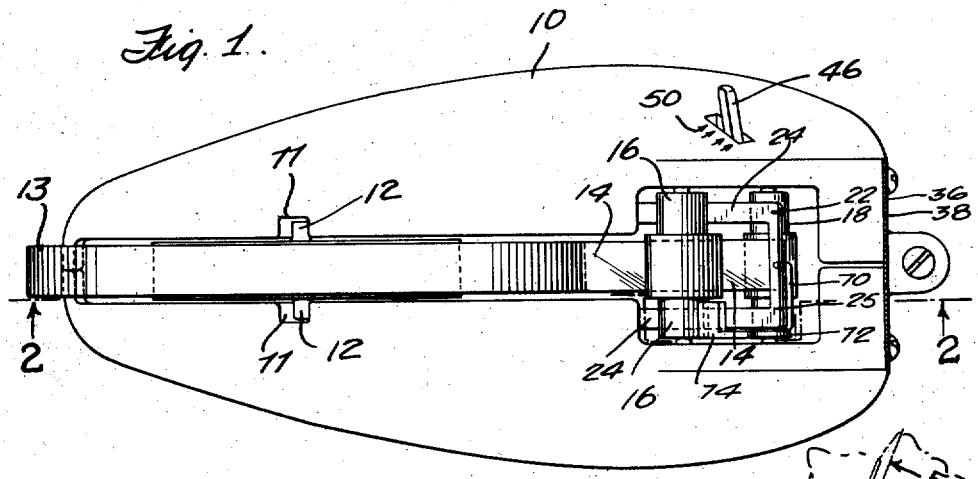
Figure 1 is a top plan view of an embodiment of my invention.
Figure 2:
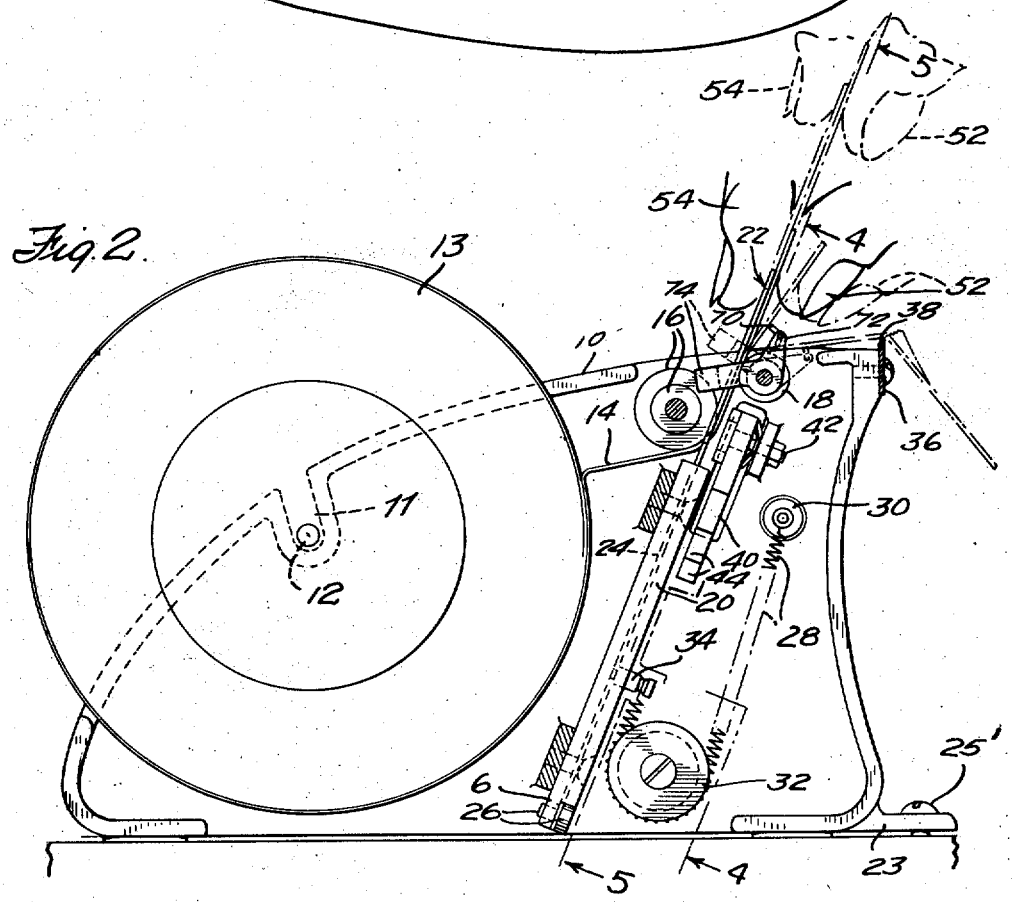
Figure 2 is a longitudinal vertical section taken on the line 2—2 of Figure 1.
Figure 3:
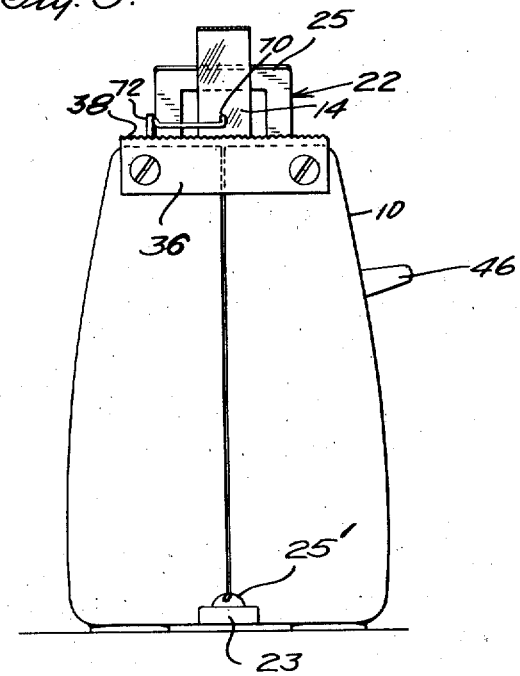
Figure 3 is a front elevation of the machine.

Referring now to Figures 1 through 6, a dispensing machine is shown having an outside casing 10 of roughly triangle shape in side elevation, the hypotenuse of the triangle preferably being curved as shown in Figure 2 and having slots 11 which accommodate shaft 12 which carries the roll 13 of tape to be delivered. The tape web 14 is drawn from the roll and passes, tacky side in, about the guide roll 16 and meets the guide roll 18 on its non-tacky side. The roll 18 is positioned to change the direction of the tape to a more vertical position as particularly illustrated in Figure 2 and the inherent stiffness of the tape insures that the end of the tape will be presented extending upwardly from the machine as there illustrated. It will be observed that as the tacky side of the tape passes in contact with the roll 16 it will adhere thereto throughout the arc of contact, peeling off from the roll as the leading end of the tape is drawn upwardly. The roll 16 thus constitutes an adhesion and supporting roll which will maintain the leading end of the tape in position between successive operations of the dispenser and will not permit the leading end of the tape to slip back into the machine from a position where it can be grasped for the next dispensing operation. Between operations the leading end of the tape adhering to the roll 16 will tend to project upwardly therefrom in the direction in which it was left after the preceding operation. The guide roll 18 causes the pull on that part of the tape leaving the adhesion roll 16 to be at the same angle at all time.

The feeding means include the chute 20 which has the feed or measuring element or slide 22 mounted for sliding movement therein. The slide 22 may preferably be provided with the two marginal portions 24 and the connecting bridge top 25. Referring to Figure 2, it will be seen that the roll 16 directs the tape through the space between the marginal portions 24 of the slide 22 so that the web guided by the roll 18 extends from the machine in front of the slide with its non-tacky side facing the front of the machine in substantially the plane of movement of the slide. The slide is normally held against the pins 26 at the bottom of chute 20 by spring 28 which is secured to one end to the side wall of the machine as at 30, encircles the spring pulley 32 and is secured at its other end to the pin 34 mounted on the slide 22. Since the feeding movement is upward from the machine, it may be desirable in some instances to provide for securing the machine to the surface on which it is placed and to this end the base extension 23 is provided which may be secured thus in any manner desired as by screw 25'.

The machine is also provided with tear-off knife 36 which is mounted transversely of the path of the tape in the front of the machine as shown in Figure 2 and is preferably considerably in advance of the point where the chute extends from the machine so that a leading end of the tape will remain after severing for grasping on the next feeding stroke. The knife 36 may have a serrated edge 38 if desired or may be in the form of a blade or the like. It is a particular advantage that the tape only engages the tear-off knife on its non-treated or non-tacky side so that gumming of the tape by the adhesive will not ordinarily be encountered.

Figure 5:
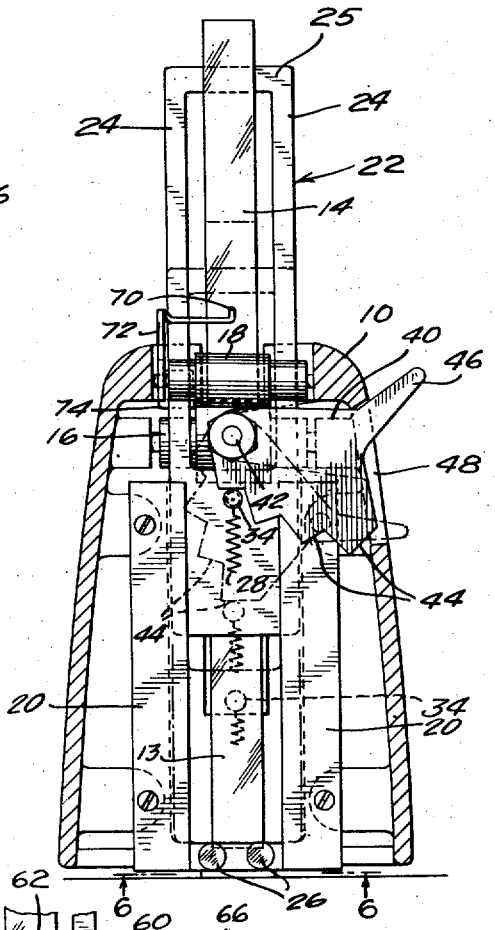
Figure 5 is a transverse substantially vertical section of the machine taken on the line 5—5 of Figure 2 showing the tape measuring device in extended position and illustrating the means for varying the length of tape delivered.
Figure 4:
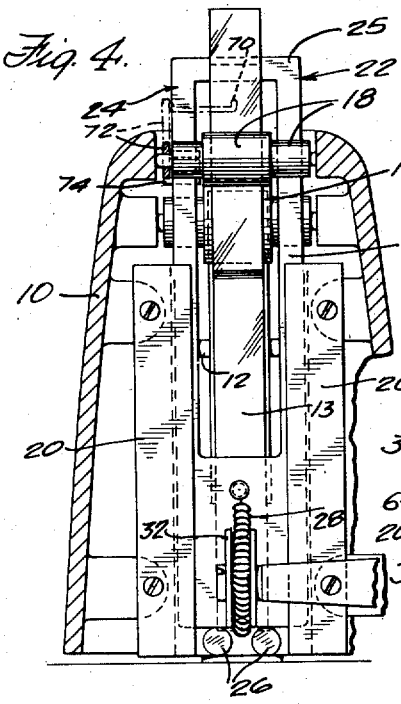
Figure 4 is a transverse substantially vertical section taken on the line 4—4 of Figure 2 showing the tape measuring element in retracted position.

It will be seen that the extent to which the slide 20 moves from its lowermost position against the pins 26 will determine the length of tape fed and in Figure 5 is illustrated a preferred means for adjusting this length of movement. This means includes the sector 40 pivoted at 42 and having the teeth 44 and the handle 46 which extends through the slot 48 in the side wall 10 of the machine. By moving the handle 46 the sector 40 is moved about the pivot 42 to place one or another of the teeth 44 in the way of the pin 34 as the slide 22 is pulled from the machine and prevent its further upward travel in the chute 20. Referring to Figure 5, it will be seen that when the uppermost tooth is placed in the way of the pin 34, a considerable length of movement of the slide will be permitted but as shown in the dotted position of the sector when the lowermost tooth is met by the pin 34 in its upward travel, a considerably shorter movement of the slide is possible. Lengths of movement of the slide in between these two extremes are provided by the remainder of the teeth, and arrows 50 or other suitable insignia may be embossed or otherwise suitably indicated upon the wall 10 of the machine so that the handle 46 may be placed in the desired position to limit the movement of the slide.

It sometimes occurs that the tape being dispensed does not have sufficient inherent stiffness so that the guide roller 18 makes it stand up away from the knife 38 for a sufficient distance to enable the thumb of the operator to grasp it when it is desired to dispense a piece of tape. To avoid this difficulty I prefer to provide the device with deflector means for deflecting the leading end of the tape upwardly toward the plane of movement of the slide after the severing of a previous delivered strip has been accomplished. These means include the wire 70 which is secured to the bell crank 72. The bell crank 72 is pivoted on the same axis as the roller 18 and has weight 74 which causes it normally to assume the full line position of Figure 1 in which position it supports the leading end of the tape as shown. The bell crank is preferably loosely mounted on the axle of the roller 18, however, so that when the roller 18 revolves, there will not be an undue tendency to rotate the bell crank. It can be seen, however, that when the tape is drawn down across the knife edge 38, the crank 72 will move downward under the pressure of the tape and will only move the tape into upwardly extending position after severance.

The operation of the construction is as follows: With a portion of tape extending upwardly from the machine in the manner shown in Figure 2 to a distance beyond the normal position of the bridge portion 25, the tape and the bridge are grasped between the thumb 52 and finger 54. The slide 22 is then drawn upward by the thumb and finger as far as the slide will travel depending upon the position of the sector 40 to for example the position illustrated in dotted lines in Figure 2 and the thumb may then be slid off the bridge 25 and the tape strip moved downward toward the cutter 36 thus disengaging its tacky side from the bridge 25 whereupon the spring 28 will draw the slide 22 back against the base stop posts 26, the tape remaining adhered to the finger of the operator, The tape is continued in its downward movement against the knife 36 and severed whereupon the portion rearward of the severing point will spring up or be pushed up by the deflector 70 into substantially the full line position of Figure 2 ready for the next delivery.

Figure 7:
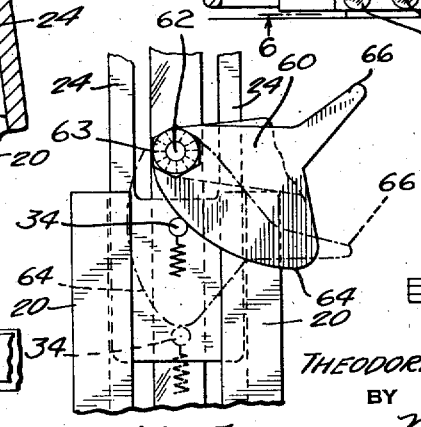
Figure 7 is a fragmentary transverse vertical sectional view of a modified form of means to vary the length of tape delivered.
Figure 6:
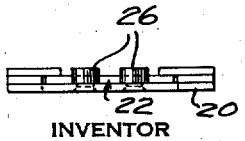
Figure 6 is a section taken on the line 6—6 of Figure 5.

In Figure 7 I have illustrated an optional form of means for varying the length of tape delivered including the sector 60 pivoted at 62 by a friction type nut 63 which is adapted to hold the sector in the position to which it is set. The sector is provided with curved surface 64 and handle 66 and it will be seen that in the uppermost position of the handle, the pin 34 will extend its maximum distance upward resulting in the maximum length of tape whereas in the lowermost position of the handle shown in dotted lines in Figure 7, the position of the curved surface 64 will be such that the pin 34 will extend only the minimum distance upward from the base and the curve 64 provides intermediate these two extreme points for intermediate lengths to be delivered, which lengths are not limited to a small number of set positions, but may be anywhere between the maximum and minimum lengths.

The strip serving machine disclosed in the present application embodies some of the same principles of operation as the strip serving machine forming the subject matter of my application for patent, Serial No. 454,153, filed August 8, 1942. In so far as there is broad subject matter of invention common to the two cases, such common subject matter is claimed in said companion application.

While I have illustrated and described in detail certain forms of my invention, I do not wish to be understood as limiting myself to the use of such forms, as I realize that changes within the scope of the invention are possible, and I further intend each element or instrumentality recited in any of the following claims to be understood to refer to all equivalent elements or instrumentalities for accomplishing substantially the same result in substantially the same or equivalent manner, it being my purpose to cover my invention broadly in whatever form its principle may be utilized.

I claim:

1. A device for delivering strips of tacky material including a support for a supply of the material, a chute containing a slidable delivery element mounted to be partially withdrawn from said chute, said element having an aperture therein, guide means for guiding the leading end of the tape through the aperture and then directing it into the plane of movement of the delivery element, means permitting grasping of the delivery element and the leading end of the tape simultaneously to draw said element from the chute and simultaneously draw tape from the roll, stop means to limit the sliding movement of the delivery element and means to return said element to its original position without releasing the withdrawn strip of tape.

2. A machine for delivering strips of tacky material including a support for a supply of the material, a reciprocating feed element, said element having means to engage the tacky side of the tape near its leading end, means to permit the feed element to be reciprocated and tape drawn from the supply simultaneously, a severing knife mounted forwardly of said supply and said element whereby a fed strip may be detached from said element and brought into severing contact with said knife by forward movement from said element.

3. A machine for delivering strips of tacky material including a support for the supply of material, a reciprocating feed element in the form of a substantially flat plate mounted for movement in the direction of the length of said plate, means to bring the leading end of the tape from said supply into the plane of movement of the reciprocating feed element and means on said feed element permitting grasping of said element and the leading end of the tape simultaneously to remove tape from the supply by movement of said element and said leading end of the tape in said plane.

4. In a machine of the character described means to bring the leading end of the tape from the tape supply into the plane of movement of the feed element including a shaft mounted in juxtaposition to said plane and weighted guide means pivoted on said shaft engaging the tape near the leading end thereof to move it toward the plane of said element.

5. A machine for delivering strips of tacky material having a support for a supply of material, a reciprocating feed element mounted for movement in a direction to withdraw tape from the supply, said feed element having a member to which the tacky side of the tape is adapted to adhere, a tape cutter mounted at one side of the feed element and spaced therefrom, the cutter being mounted at that side of the feed element which exposes the blank non-tacky surface of the strip, and a movable deflector for deflecting the end of the strip after severance of the previously fed length of tape toward the reciprocating feed element.

6. A device for serving strips of tacky material including a support for a roll of tape, a reciprocating measuring element mounted for limited reciprocal movement in the direction of feed, said measuring element being apertured to permit the passage of the leading end of the tape from one side to the other thereof, and guide means for leading the leading end of the tape through the aperture and into a plane parallel with the direction of movement of the measuring element, with an adhesive side of the tape facing the measuring element, said measuring element being formed to permit it to be grasped by the fingers of one hand together with the leading end of the tape, so that it and the tape may be simultaneously moved to draw tape and the element from the machine.

7. A machine as claimed in claim 6 having a device for automatically returning the measuring element to its initial position as soon as it is released by the fingers of the operator, and the tape is separated therefrom.

8. A machine as claimed in claim 6 in which a spring is connected to the reciprocating measuring element and is stressed by the drawing out of the measuring element, and acts to return said element to its initial position as soon as said element is released.

9. A machine as claimed in claim 6 in which said aperture is at least as long as the longest reciprocal movement of the element.

10. A machine as claimed in claim 6 in which presettable adjustable means are provided to intercept the outward movement of the reciprocally slidable measuring element to limit the movement of said element, whereby the length of tape to be fed may be predetermined.

11. A device for serving strips of tacky material including a support for a supply of material, a reciprocating measuring element mounted for reciprocal movement in the same direction in which the tape is to be fed, said reciprocating element having a tape adhesion surface to which the tape may be caused to adhere during the movement of the reciprocating element and the feeding of the tape, and spring means for returning the reciprocating element to its initial position as soon as released at the conclusion of a feeding operation.

12. A device for serving strips of tacky tape including a frame adapted to be supported upon a table or the like, and provided with means for supporting a roll of tacky tape, said frame having an opening in the top thereof for withdrawal of the tape, an adhesion roller mounted on a horizontal axis and located adjacent to said opening in the top of the frame, and in position to engage the tacky side of the tape and to support the free end thereof by adhesion of the tape thereto with the leading end projecting through said opening, a slide disposed in a generally upright attitude, means guiding the slide for reciprocation in up and down direction, said slide having a tape supporting portion at the top thereof projecting at all times above the top of the frame so that the projecting end of said slide and the leading end of the tape may be grasped simultaneously and drawn out to feed tape.

13. A device for serving strips of tacky tape including a frame adapted to be supported upon a table or the like, and provided with means for supporting a roll of tacky tape, said frame having an opening in the top thereof for withdrawal of the tape, an adhesion roller mounted on a horizontal axis and located adjacent to said opening in the top of the frame, and in position to engage the tacky side of the tape and to support the free end thereof by adhesion of the tape thereto with the leading end projecting through said opening, a measuring slide disposed in a generally upright attitude, means guiding the slide for reciprocation in an up and down direction, said slide having a tape supporting portion at the top thereof projecting at all times above the top of the frame so that the projecting end of said slide and the leading end of the tape may be grasped simultaneously and drawn out to feed tape, stop means for limiting the distance through which the slide may be drawn upwardly, so that the slide may be used to measure the length of tape drawn out, and means for severing the measured length of tape.

14. A device for serving strips of tacky tape including a frame adapted to be supported upon a table or the like, and provided with means for supporting a roll of tacky tape, said frame having an opening in the top thereof for withdrawal of the tape, an adhesion roller mounted on a horizontal axis and located adjacent to said opening in the top of the frame, and in position to engage the tacky side of the tape and to support the free end thereof by adhesion of the tape thereto with the leading end projecting through said opening, and a tape supporting plate extending in an upright attitude adjacent said opening and above the top of the frame, to facilitate grasping of the leading end of the tape and the withdrawal thereof in an upward direction.

15. A device for serving strips of tacky tape including a frame adapted to be supported upon a table or the like, and provided with means for supporting a roll of tacky tape, said frame having an opening in the top thereof for withdrawal of the tape, an adhesion roller mounted on a horizontal axis and located adjacent to said opening in the top of the frame, and in position to engage the tacky side of the tape and to support the free end thereof by adhesion of the tape thereto with the leading end projecting through said opening, and guide means engageable with the tape beyond the adhesion roller for limiting the direction in which pull may be exerted upon that part of the tape leaving the adhesion roller.

THEODORE H. KRUEGER.